(12) United States Patent
Ritter et al.

(10) Patent No.: US 12,351,145 B2
(45) Date of Patent: Jul. 8, 2025

(54) METHOD OF DAMAGE PREDICTION FOR ELECTRIC PARK BRAKE AND ADAPTATION THEREOF

(71) Applicant: AKEBONO BRAKE INDUSTRY CO., LTD, Tokyo (JP)

(72) Inventors: George Douglas Ritter, Royal Oak, MI (US); Gang Lou, Rochester, MI (US); Eric J. Roszman, Ovid, MI (US)

(73) Assignee: AKEBONO BRAKE INDUSTRY CO., LTD., Tokyo (JP)

( * ) Notice: Subject to any disclaimer, the term of this patent is extended or adjusted under 35 U.S.C. 154(b) by 504 days.

(21) Appl. No.: 17/667,845

(22) Filed: Feb. 9, 2022

(65) Prior Publication Data

US 2022/0289164 A1 Sep. 15, 2022

Related U.S. Application Data

(60) Provisional application No. 63/158,670, filed on Mar. 9, 2021.

(51) Int. Cl.
*B60T 17/22* (2006.01)
*B60T 13/74* (2006.01)
*F16D 66/00* (2006.01)

(52) U.S. Cl.
CPC .............. *B60T 17/22* (2013.01); *F16D 66/00* (2013.01); *B60T 13/746* (2013.01);
(Continued)

(58) Field of Classification Search
CPC .... B60T 17/22; B60T 13/746; B60T 2210/30; B60T 2270/406; B60T 8/885; B60T 13/741; F16D 66/00; F16D 2066/001; F16D 2066/003; F16D 2066/005; F16D 2066/006; G06F 30/20; G06F 2119/02
See application file for complete search history.

(56) References Cited

U.S. PATENT DOCUMENTS 10,137,878 B2 * 11/2018 Ritter .................... B60T 13/741
10,689,004 B1 6/2020 Kulkarni et al.
(Continued)

FOREIGN PATENT DOCUMENTS

CN 102029985 A 4/2011
CN 110962860 A 4/2020
(Continued)

OTHER PUBLICATIONS

EP Extended Search Report dated Jul. 21, 2022, Application No. 22159222.3.
(Continued)

*Primary Examiner* — Russell Frejd
*Assistant Examiner* — Ana D Thomas
(74) *Attorney, Agent, or Firm* — The Dobrusin Law Firm, P.C.

(57) ABSTRACT

A method of determining the cumulative damage of a brake system, the method comprising: (a) estimating or measuring one or more brake forces based upon one or more parameters; (b) determining a cycle for each of the brake forces and associating each brake force with the determined cycle; and (c) determining a cumulative damage of the brake system based upon the determined cycles and the associated brake forces.

17 Claims, 3 Drawing Sheets

(52) U.S. Cl.
CPC ..... *B60T 2210/30* (2013.01); *B60T 2270/406* (2013.01); *F16D 2066/001* (2013.01); *F16D 2066/003* (2013.01); *F16D 2066/005* (2013.01); *F16D 2066/006* (2013.01)

(56) References Cited

U.S. PATENT DOCUMENTS

| | | | |
|---|---|---|---|
| 2008/0236269 A1* | 10/2008 | Howell ................. | B60T 17/221 73/121 |
| 2011/0073423 A1 | 3/2011 | Moon | |
| 2015/0239439 A1* | 8/2015 | Sussek ................. | B60T 13/588 701/70 |
| 2016/0138665 A1* | 5/2016 | Antanaitis ............... | B60T 17/22 701/70 |
| 2016/0375881 A1* | 12/2016 | Ayichew ................. | B60T 8/172 701/70 |
| 2017/0249788 A1 | 8/2017 | Remboski et al. | |
| 2019/0039587 A1 | 2/2019 | Ritter | |
| 2019/0071062 A1* | 3/2019 | Robere ..................... | B60L 3/12 |
| 2019/0107163 A1* | 4/2019 | Medinei ................. | F16D 66/026 |
| 2020/0012993 A1 | 4/2020 | Antanaitis et al. | |
| 2020/0102993 A1* | 4/2020 | Antanaitis ............... | B60T 17/22 |
| 2020/0232531 A1* | 7/2020 | Robere ................... | F16D 66/00 |

FOREIGN PATENT DOCUMENTS

| | | |
|---|---|---|
| DE | 102006061656 A1 | 7/2008 |
| FR | 2959717 A1 | 11/2011 |
| WO | 2017/062590 A1 | 4/2017 |

OTHER PUBLICATIONS

Chinese Office Action, CN Application No. 202210196321.8 dated Aug. 19, 2023.

* cited by examiner

METHOD OF DAMAGE PREDICTION FOR ELECTRIC PARK BRAKE AND ADAPTATION THEREOF

FIELD

The present teachings generally relate to a brake system, and more particularly, to a method of predicting damage within an electric park brake system.

BACKGROUND

Parking brake systems are used in a variety of vehicles to prevent movement of a stopped or parked vehicle. In disc brake systems, the parking brake system may move a pair of opposing brake pads into engagement with a brake rotor to create a parking brake force. Similarly, in drum-in-hat brake systems, the brake system may move a pair of brake shoes radially outward against the drum portion of a brake rotor to create a parking brake force.

In some applications, parking brake systems are electromechanical systems that may include a motor and an actuator assembly for moving the brake pads or the brake shoes against the brake rotor or the drum portion of a brake rotor, respectively, to create the parking brake force. Some known parking brake systems use a position sensor to determine a position of the actuator assembly and/or a position of one or more brake pistons to determine whether a parking brake force has been created or released.

However, to reduce cost, space, and weight, and to comply with updated vehicle guidelines and recommendations, brake systems may be free of such a position sensor. As a result, the brake system may now be required to determine a position of the actuator assembly, a brake piston, a motor, or a combination thereof based upon control logic within a control unit of the brake system. Similarly, the brake system may also be required to determine a clamping force of the brake system using similar control logic free of any pressure sensor. The control logic may evaluate one or more parameters of the brake system, such as voltage, current, time intervals, or a combination thereof to determine a position of the actuator assembly, a brake piston, a motor, or a combination thereof.

Due to updated vehicle guidelines requiring a brake system to be free of one or more sensors, such as a position sensor or pressure sensor, it may be difficult to accurately monitor a condition of the brake system. Similarly, a brake system using control logic to evaluate one or more parameters of the brake system may facilitate further advancement in monitoring the brake system. For example, over time the creation of a parking brake force may wear one or more mechanical components within the brake system, such as the brake actuator assembly, the brake piston, the motor, or a combination thereof, eventually to the point of degradation and/or failure. As a result, it may be critical to evaluate and/or monitor a condition of the brake system during operation to prevent catastrophic failure that may result in injury to an occupant of a vehicle, significant damage to the vehicle, or both.

An example of a method for monitoring a parking brake system can be found in U.S. Pat. No. 10,137,878 and US Patent Publication No. 2019/0039587, both of which are incorporated herein in their entireties for all purposes. Based on the above, there remains a need for a more robust method of monitoring a brake system. What is needed is a method of monitoring a brake system to evaluate a wear condition of one or more components of the brake system. Additionally, there remains a need for a brake system that meets updated vehicle guidelines, yet still provides accurate monitoring and/or evaluation of the brake system. What is needed is a brake system free of position sensors, pressure sensors, or both that monitors a condition of the mechanical components of the brake system using control logic. Furthermore, there remains a need for a brake system that helps prevent catastrophic failure that may result in severe damage to a vehicle, injury to an occupant, or both. Thus, what is needed is a brake system that tracks the cumulative damage of one or more components within the brake system to determine a potential point of degradation and/or failure preemptively.

SUMMARY

The present teachings meet one or more of the present needs by providing a method of determining the cumulative damage of a brake system, the method comprising: (a) estimating or measuring one or more brake forces based upon one or more parameters; (b) determining a cycle for each of the brake forces and associating each brake force with the determined cycle; and (c) determining a cumulative damage of the brake system based upon the determined cycles and the associated brake forces.

The method may include that step (a) is completed by estimating a rotational angle of a motor of the brake system based upon the one or more parameters to estimate the one or more brake forces. The one or more parameters may be a measured voltage and a measured current of the motor. Additionally, prior to step (c), each of the determined cycles and the associated brake forces may be stored, and the cycles may be grouped together by brake force. Moreover, determining the cumulative damage in step (c) may be completed by determining a fraction of life consumed by the brake system, and the fraction of life consumed by the brake system may be determined by comparing the total number of cycles in the group to an average number of cycles until failure of the brake system at the brake force associated with the group. The comparing may be completed for a plurality of groups, each of the plurality of groups designated by a brake force.

The teachings herein may also provide a method, wherein: the cumulative damage may be determined using Miner's Rule; the brake force for each cycle may be constant or vary, and the brake force may be based upon parking conditions; the determined cycles and their associated brake forces may each be weighted based upon one or more factors; or a combination thereof. The one or more factors may include an external temperature during operation of the brake system, an internal temperature during operation of the brake system, or both. The one or more factors may include a voltage within the brake system. The one or more factors may include a pad wear condition of one or more brake pads in the brake system. Additionally, the brake system may be free of a pressure sensor, a force sensor, a position sensor, or a combination thereof. Furthermore, the brake system may be an electric park brake system or an electromechanical brake system.

The present teachings may provide a method, wherein the cumulative damage of the brake system may determine a point of degradation or failure of the brake system or one or more components of the brake system. The one or more components may be a motor, a spindle, an actuator assembly, a nut, or a combination thereof. The method may be completed within a control module of the brake system. Similarly, storage of the determined cycles may be completed by a memory unit of the control module and calculation of the cumulative damage may be completed by one or more processors of the control module. The cumulative damage calculated may also be compared to a threshold value. Moreover, a signal or warning may be transmitted from the control module when the cumulative damage exceeds the threshold value. Additionally, the threshold value may be less than a value when failure of the brake system occurs.

The teachings herein may provide a more robust method of monitoring a brake system. The brake system may evaluate a wear condition of one or more components of the brake system. The brake system may meet updated vehicle guidelines, yet still provide accurate monitoring and/or evaluation of the brake system. The brake system may be free of position sensors, pressure sensors, or both yet still monitors a condition of the mechanical components of the brake system using control logic. Additionally, the brake system may help prevent catastrophic failure that may result in severe damage to a vehicle, injury to an occupant, or both. Moreover, the brake system may track the cumulative damage of one or more components within the brake system to determine a potential point of degradation and/or failure preemptively.

DETAILED DESCRIPTION

Figure 1:
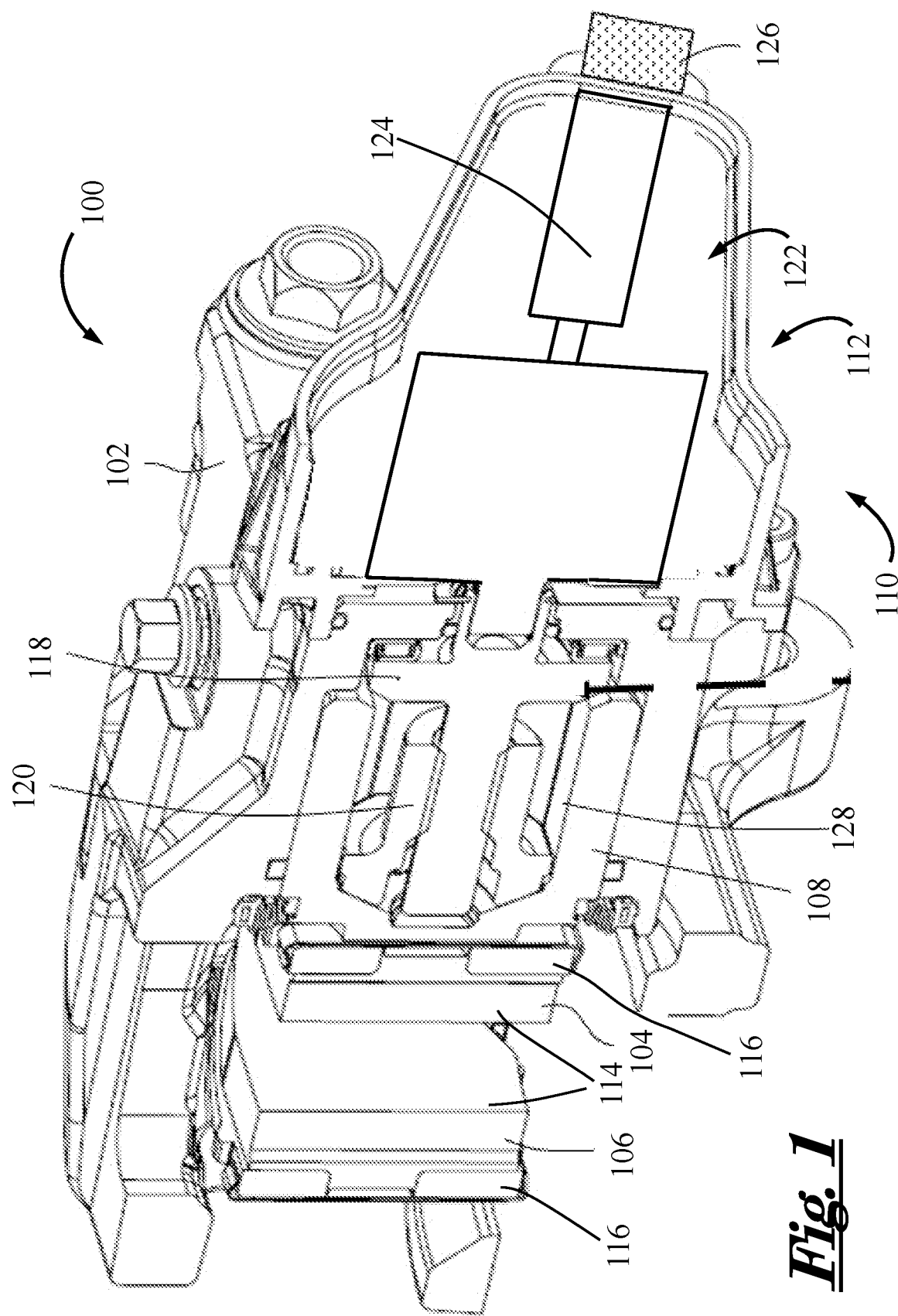
FIG. 1 is a perspective cross-sectional view of a brake system including a motor on caliper parking brake system.

The explanations and illustrations presented herein are intended to acquaint others skilled in the art with the teachings, its principles, and its practical application. Those skilled in the art may adapt and apply the teachings in its numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the description herein, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The present teachings are predicated upon providing a method for controlling a parking brake system. The present teachings provide a method of accurately estimating and determining the position of a motor, the actuator assembly, and/or the brake piston without using one or more position sensors. The teachings herein provide an accurate system for determining a parking brake force. The teachings herein provide an accurate system or model for relating translational displacement of an actuator assembly and/or a brake piston to the parking brake force. The teachings herein also provide a method of accurately calculating a cumulative damage of the brake system or one or more brake assemblies therein. The method of accurately calculating the cumulative damage accurately determines when the brake system or one or more brake assemblies therein will degrade and/or fail.

The present teachings make use of a brake system. The brake system may be any device, system, and/or assembly that may create a braking force. For example, the brake system may be a disc brake system, a drum brake system, a drum-in-hat brake system, or a combination thereof. The braking force may be created during a standard application of the service brake. The braking force may be any force that, when coupled with a brake pad or a brake shoe coefficient of friction, slows, stops, and/or prevents movement or rotation of a brake rotor or a brake drum, respectively; slows, stops, and/or prevents movement of a vehicle; or a combination thereof. The disc brake system may include a brake rotor, one or more brake pads, and a brake caliper supporting one or more brake pistons and the parking brake system, which may include a motor gear unit (MGU) and an actuator assembly. The drum-in-hat brake system may include a drum brake, one or more brake shoes, and a backing plate supporting the parking brake system, which may include a motor and an actuator assembly.

The brake rotor may cooperate with the components of the disc brake system, the components of the parking brake system, or both to create a braking force during a standard brake apply; a parking brake force during a parking brake apply; or both. The brake rotor may rotate with a wheel and axle of a vehicle when the vehicle is in motion. The brake rotor may include an inboard side and an opposing outboard side. To create the braking force, the parking brake force, or both, the friction material of the one or more brake pads may be moved or pushed against at least one of the sides of the brake rotor. After the one or more brake pads are moved or pushed against the brake rotor, the brake rotor may be restricted from rotating, and, accordingly, the vehicle may be slowed, stopped, and/or restricted from moving. After the friction material of the one or more brake pads is moved away from the brake rotor, the brake rotor and, accordingly, the vehicle can once again move.

The brake caliper may function to support one or more the components of the brake system, one or more the components of the parking brake system, or both. The brake caliper may be connected to a knuckle or a support structure of a vehicle. The brake caliper may support one or more brake pistons, one or more brake pads, and one or more actuator assemblies.

The one or more brake pistons may function to move a brake pad, or a corresponding end of brake pad, towards a side of the brake rotor to create the clamping force. During a parking brake apply, and/or during release of the parking brake apply, the brake piston may be moved by a corresponding actuator assembly. The brake piston may include a closed end selectively engaging the pressure plate of an inboard brake pad and an open end defining an opening into a piston pocket. The piston pocket may function to receive at least a portion of an actuator assembly. The piston pocket may be a cup or recess formed into one end of the brake piston.

The one or more brake pads may function to create the parking brake force. The one or more brake pads may include a pressure plate and a friction material. The pressure plate of the one or more inboard brake pads may be in communication with the one or more brake pistons, and the pressure plate of the one or more outboard brake pads may be in communication with one or more brake caliper fingers. During a parking brake apply, the actuator assembly may move one or more brake pistons, which may cause the one or more inboard brake pads, or ends of the one or more inboard brake pads to move against the brake rotor to create the parking brake force. The one or more caliper fingers may move the one or more outboard brake pads against the brake rotor to create the parking brake force.

The actuator assembly may function to move the one or more brake pistons, the one or more brake pads, or both towards the brake rotor to create the parking brake force. The actuator assembly may function to move the one or more brake pistons, the one or more brake pads, or both away from the brake rotor to release the parking brake force. In a disc brake system, the actuator assembly may comprise a motor gear unit (MGU), a spindle, and a nut. In a drum-in-hat brake system, the actuator assembly may include a motor, a spindle, a nut, and a brake cable.

The motor gear unit (MGU) may function to generate and/or transfer a force or torque that is suitable for creating and/or releasing the parking brake force. During application of the parking brake system, the MGU may function to generate a force or torque that is sufficient to move the one or more corresponding spindle and nuts, the one or more brake pistons, the one or more brake pads, or a combination thereof towards the brake rotor. During release of the parking brake, the MGU may function to generate a force or torque that is sufficient to move the one or more corresponding spindle and nuts, the one or more brake pistons, or both away from the one or more brake pads so that the brake pads move away from the brake rotor. The MGU may be any device or combination of device that may function to perform one or more of the aforementioned functions. The MGU may include a motor. The motor may be any suitable motor. For example, the motor may be a DC motor, a series wound motor, a shunt wound motor, a compound wound motor, a separately exited motor, a servomotor, or a permanent magnet motor. The MGU may include or may be in communication with one or more gears or gear trains that may function to transfer, increase, and/or decrease an output force or torque generated by the motor. At least a portion of the MGU may be contained within a housing. The housing may be integrally formed with the brake caliper; removably attached to the brake caliper; permanently attached to the brake caliper; or attached in any suitable way to the vehicle. The one or more gears or gear trains may be located within the housing or located outside of the housing. The one or more gears or gear trains may be located intermediate an output shaft of the motor or MGU and one or more spindles.

The one or more spindles may function to transfer torque from the motor, the MGU, one or more gears or gear trains, or a combination thereof into a linear force to move a corresponding nut, a corresponding brake piston, and/or a corresponding brake pad towards the brake rotor to create the parking brake force. The one or more spindles may function to transfer torque from the motor, the MGU, or both into a linear force to move a corresponding nut, a corresponding brake piston, and/or a corresponding brake pad away from the brake rotor to release the parking brake force. Each of the one or more spindles may have an input portion that is in communication with an output of the motor, the MGU, or both, and an output portion that is in communication with a corresponding nut. The input portion may receive motor torque from the motor, the MGU, or both, which may cause the spindle to rotate. The input portion may include any suitable connection for connecting with the motor, the MGU, or both. For example, the connection may include a threaded engagement, a friction engagement, an interference engagement, and/or the input portion may be coupled to the motor gear unit with one or more mechanical fasteners. Preferably, the connection is keyed (i.e., may include teeth, gears, notches, grooves, etc.). The output portion of the one or more spindles may include any suitable connection for connecting with the nut. Preferably, the output portion may engage a corresponding nut with a threaded engagement; however, a sliding engagement, an interference engagement, a permanent engagement, a removable engagement, a keyed engagement, or any other suitable engagement may be used.

Each of the one or more nuts may function to move a corresponding brake piston. That is, each of the one or more nuts may be in received in a piston pocket of a corresponding brake piston. The one or more nuts may transmit torque received from a corresponding spindle into a linear force to axially move the brake piston along a piston axis towards and/or away from a bottom surface of the piston pocket. In other words, rotation of a corresponding spindle may cause the corresponding nut to move axially along a nut axis. For example, during a parking brake apply, the spindle may rotate in a first or apply direction, which may cause the nut to move in a first or apply direction towards the bottom surface of the piston pocket. Further rotation of the spindle may cause the nut to engage the bottom surface of the piston pocket and then move the brake piston and the brake pad until the friction material of the brake pad eventually engages the brake rotor. During release of the parking brake apply, the spindle may rotate in a second or release direction, which may cause the nut to move in a second or release direction away from the bottom surface of the piston pocket so that the brake piston and the brake pad can move away from and disengage the brake rotor.

The spindle and nut may be self-locking, meaning the spindle and nut can sustain the parking brake force once created. Self-locking may mean the spindle and nut do not back drive unless a sufficient opposing force or torque is applied to the spindle, nut or both, that overcomes the coefficient of friction of the spindle and nut. Self-locking may mean that the spindle and the nut are a low efficiency device. Due to the self-locking effect between the spindle and the nut, there may be stiction (i.e., friction that prevents the spindle and nut from being set in motion) within the actuator assembly when transitioning from static to dynamic states. Accordingly, because position, force, or estimation is only valid during non-zero motor speed, the stiction of the actuator assembly may be ignored, and the dominant friction can be considered dynamic.

The spindle and the nut may be a high efficiency device or a non-locking device. A high efficiency device may convert a thrust force or load into a rotational force or torque and, as such, may back drive. Accordingly, the high efficiency device may require a mechanical brake or lock assembly to prevent back driving and sustain the linear output force. That is, the high efficiency device may require a mechanical brake or lock to maintain the clamping force of the parking brake assembly. In other words, because the coefficient of friction is generally low in a high efficiency device, back driving may occur when a reaction force applied onto the spindle, the nut, or both, is greater than the static force or coefficient of friction of the device. This may undesirably cause the spindle, nut, or both to move or rotate in an opposing direction. Without a mechanical brake or lock to prevent back driving, the high efficiency devices may undesirably, and prematurely, release the clamping force after it is created and the MGU is turned OFF. The mechanical brake to prevent such back driving may be located inside or within the motor, within the gear train, in the MGU, or anywhere in the brake system or the parking brake system.

A high efficiency device may be, for example a ball screw, a roller screw, s ball ramp, or a combination thereof. Ball screws may use ball bearings as the load transfer elements between the nut and spindle or screw. During movement of the ball screw, the ball bearings may circulate along races or grooves between the spindle and the nut. A roller screw is similar to a ball screw except that roller screws use rollers as the load transfer elements between nut and screw. The load on a ball screw, the roller screw, or both is distributed over a large number of ball bearings or rollers, via roller threads, respectively, so that each ball bearing or roller, when subjected to force, may roll and therefore, friction is reduced, which may equate to high efficiency. Accordingly, less force or torque may be required to move a spindle and nut in a ball screw or roller screw in an apply direction, a release direction, or both. A ball ramp may include a rotating side and a stationary side with rolling elements interposed there between. A torque input causes the rotating side to rotate, which also causes the rolling elements to engage and roll along the ramps between the rotating side and the stationary side. The ramps include a deep end and a shallow end. When the rotating side is rotated such that the rolling elements move or roll to the shallow side of the ramp, the rolling elements provide an axial force against the stationary side, thus axially moving the stationary side.

To create the parking brake force in a disc brake system, the parking brake system may be activated. Activation may occur by, for example, pushing a button, pulling a cable or lever, putting the vehicle in a parking position (i.e., automatically activated), etc. Once activated, the MGU, the motor, or both may create or generate a motor torque, which may cause the one or more spindles to rotate in a first or apply direction. Rotation of one or more of the spindles in the first or apply direction may cause the corresponding nuts to axially move in the first or apply direction towards the bottom of the corresponding piston pockets. Further rotation of the one or more spindles in the first or apply direction may cause the one or more brake pistons to move the one or more brake pads, or an end of the brake pads towards the inboard surface of the brake rotor to create the parking brake force.

To release the parking brake force in a disc brake system, the parking brake system may be activated. Activation may occur by, for example, pushing a button, pulling a cable or lever, putting the vehicle in a drive gear (i.e., automatically activated), etc. Once activated, the MGU, the motor, or both may create a rotational force or motor torque, which may cause the one or more spindles to rotate in a second or release direction. Rotation of one or more of the spindles in the second or release direction may cause the corresponding nuts to axially move in the second or release direction away from the bottom of the corresponding piston pockets. Further rotation of the one or more spindles in the second or release direction may cause the one or more brake pistons and therefore the one or more brake pads to move away from the inboard surface of the brake rotor and release the parking brake force.

The parking brake system in a disc brake system, drum-in-hat brake system, or both may have control logic for accurately estimating and determining a position of the actuator assembly (e.g., the spindle and the nut), a position of the brake piston, a position of the motor, current draw by the motor, motor speed, an amount of parking brake force or clamping force, or a combination thereof. The control logic may be embedded in a control module. The control module may be an electronic control unit, a stability control unit, or the like. The control module, the control logic, or both may include a linear time variant observer (LTV) for estimating a position of the actuator assembly, a position of the brake piston, a position of the motor, or a combination thereof. The caliper dynamics considered for estimation of position and/or force may be non-linear. The non-linear caliper dynamics may be linearized about a particular operating state (e.g., a parking brake apply or a parking brake release) based on the estimated parking brake force through feedback linearization. The linearized operating state may provide an indication of motor load during both the parking brake apply and parking brake release operations.

The control module, the control logic, the LTV, or a combination thereof may be used to estimate a position of the motor, a position of the spindle, a position of the nut, a position of the actuator assembly, the motor speed, current draw by the motor, or a combination thereof. The LTV may relate, correlate, and/or determine a current and a voltage measurement to an estimated position of the motor or rotational angle of the motor, motor velocity, current draw by the motor, or a combination thereof. A position of the actuator assembly, the brake piston, or both can be accurately estimated based on the estimated position of the motor, which is the rotational position or angle of the motor. This is because when the output shaft of the motor is rotated, the actuator assembly and thus the brake piston or brake shoe correspondingly move because they are all rigidly connected via one or more geared and/or threaded connections. The displacement or movement of the actuator assembly, the brake piston, or both may be related to the clamp force, which may also be referred to herein as the parking brake force.

During a parking brake apply in a disc brake system, as the nut axially moves towards the bottom of the piston pocket, and the brake pads are moved towards the braking surface or the brake rotor, the parking brake force can be related to the motor position based on a suitable regression model. For example, the model may be a 1st order linear regression model, a 2nd order polynomial regression, a 3rd order regression model, a 4th order regression, etc. For example, the parking brake force can be related to the motor position based on known system stiffness often modeled through use of a 2nd order polynomial regression. During a parking brake apply in a drum-in-hat brake system that has an internal compliance spring, the parking brake force can be related to the motor position based on a regression model such as a piecewise representation or a lookup table. In either case, a known system stiffness should be defined and analytically represented for relating position of the motor, actuator, and/or brake piston to clamping force or parking brake force.

One or more models or subcomponents may define the LTV. The one or more subcomponents may include a harness subcomponent, a state estimation subcomponent, a force estimation subcomponent, and a feedback linearization subcomponent. It is understood that one or more of the aforementioned subcomponents can be combined and/or cascaded. That is, for example, the force estimation subcomponent can be cascaded into the state estimation subcomponent and defined as a single subcomponent.

Turning now to the figures, FIG. 1 is a perspective, cross-sectional view of a brake system 100 that is a disc brake system. The brake system 100 includes a brake caliper 102 supporting an inner and an outer brake pad 104, 106, a brake piston 108, and a parking brake system 110 including an actuator assembly 112. The brake pads 104, 106 include a friction material 114 and a pressure plate 116. The actuator assembly 112 includes a spindle 118, a nut 120, and an MGU 122 having a motor 124. A brake rotor (not illustrated) is located between the friction material 114 of both brake pads 106, 108. A control module 126 is in communication with the brake system 100, the parking brake system 110, or both. The control module 126 includes the control logic or the LTV 300 (see FIG. 2).

To create parking brake force, the motor 124 generates torque that causes the spindle 118 to rotate in an apply direction. A gear train may be located between the motor 124 and the spindle 118 so that the torque generated by the motor 124 is increased or decreased before the torque is communicated to the spindle 118. Rotation of the spindle 118 in the apply direction causes the nut 120 to move axially in an apply direction towards a bottom surface of a piston pocket 128 in the brake piston 108. After the nut 120 engages the bottom surface of the piston pocket 128, further rotation of the spindle 118 causes the nut 120 to axially move the brake piston 108 and thus the brake pad 104 against the brake rotor. At the same time, one or more brake caliper fingers may pull the outboard brake pad 106 towards and against an opposing side of the brake rotor until a sufficient parking brake force is established.

To release the parking brake force, the motor 124 generates torque that causes the spindle 118 to rotate in a release direction. A gear train may be located between the motor 124 and the spindle 118 so that the torque generated by the motor 124 can be increased or decreased before the torque is communicated to the spindle 118. Rotational of the spindle 118 in the release direction causes the nut 120 to move axially in a release direction away from the bottom surface of the brake piston 108 thereby allowing the brake pads 106, 108 to move away from the brake rotor.

While creating and releasing the parking brake force, the control module 126 or the LTV 300 may estimate the position of the spindle 118, the nut 120, the brake piston 108, the motor 124, or a combination thereof. The control module 126, the control logic or the LTV 300 relates the displacement or position of the spindle 118, the nut 120, the brake piston 108, the motor 124, or a combination thereof to the parking brake force.

Over time, as the friction material 114 of the brake pads 104, 106 wears, the position of the spindle 118, the nut 120, the brake piston 108, the motor 124, or a combination thereof changes. That is, as the friction material 114 wears, the spindle 118, the nut 120, the brake piston 108, the motor 124, or a combination thereof must move to a new position to create an adequate clamping force or parking brake force. The LTV 300 estimates and then relates the position of the spindle 118, the nut 120, the brake piston 108, the motor 124, or a combination thereof to the clamping force and/or parking brake force so that changes in the positions can be compensated and incorporated into the next parking brake apply, for example.

Figure 2:
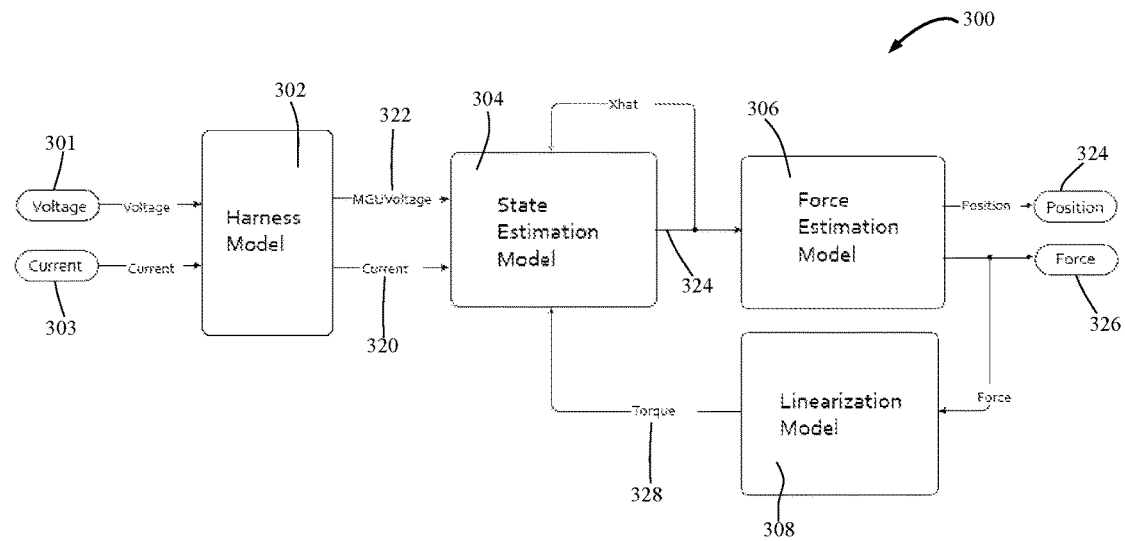
FIG. 2 is a flow diagram or control model of a linear time variant estimation (LTV).

FIG. 2 illustrates a flow diagram or control model of the linear time variant (LTV) 300 that is contained within the control module 126. As was discussed above, a position sensor may not be used in this parking brake system to determine a position of the motor, the actuator assembly, and/or the brake piston. Similarly, the parking brake system herein may also be free of a pressure sensor that determines a clamping force of the brake caliper 102. Instead, the LTV 300 may be used to accurately estimate motor position, actuator position, spindle position, nut position, or a combination thereof. The LTV 300 is also used to accurately estimate motor speed or velocity and motor current, thereby allowing the LTV 300 to be used to accurately estimate clamping force of the brake caliper 102. The control logic architecture of the LTV 300 comprises various models, that can be combined or cascaded. The models of the LTV 300 may include a harness model 302, a state estimation model 304, a force estimation model 306, and a linearization model 308.

The harness model 302 may be a model of the vehicle harness from the control module 126 to the actuator assembly 112. Current and voltage of the motor 124 is measured at the harness model 302. Before the parking brake system is actuated, the load on the motor 124 is known to be zero. Accordingly, an input voltage 301 and input current 303 to the motor 124 is known. After the parking brake system is actuated and load on the motor 124 increases in order to create or release the parking brake, the motor 124 draws additional current (i.e., motor current) from a source to keep the motor 124 running in order to actuate and move the MGU 122, the actuator assembly 112, the brake pads 104, 106, etc., to create the clamping force. As the current drawn by the motor 124 increases, the voltage at the motor terminals drops due to the harness resistance. This change in current is measured at the harness model 302. A resistance of the harness is taken into consideration in these measurements, and the motor voltage is determined based on the measured current and measured voltage at the harness model 302. A motor current measurement 320 and a motor voltage measurement 322 of the motor 124 is output from the harness model 302 and input into the state estimation model 304.

The state estimation model 304 is a model used to estimate motor position, motor velocity, and/or motor current. The state estimation model 304 may be a linearized state space model of the actuator assembly. The motor position, motor velocity, and/or motor current is estimated based on the current and voltage measurements 320, 322 from the harness model 302. One or more of the motor position, motor velocity, and motor current are contained in xhat, which is an output of the model 324. The estimated motor position 324 (contained within xhat) is output from the state estimation model 304 and inputted into the force estimation model 306. As shown and discussed at FIG. 3, the state estimation model 304 takes into consideration motor dynamics 310 and MGU dynamics 312. The estimated states (e.g., motor position, motor velocity and/or motor current; xhat) 324 is output from the state estimation model 304 and fed back into the state estimation model 304 to provide an error correction term based on estimated and measured current, as will be discussed further below.

The force estimation model 306 is a model used to estimate clamp force 326, which is used herein interchangeably with the parking brake force. The force estimation model 306 may provide a force model that can be implemented as a polynomial regression, or a lookup table for estimating the clamping force. In the force estimation model 306, clamp force is estimated based on the estimated motor position 324. However, the clamp force can be estimated based also, or instead on the estimated motor current and/or estimated motor speed. The estimated clamp force 326 may be a 2nd order polynomial regression of the estimated motor position 324. Estimated motor position 324 and estimated clamp force 326 is output from the force estimation model 306. During the parking brake apply, the clamp force is the amount of force created when the brake pads or brake shoes are pressed against a braking surface (e.g., brake rotor or brake drum, respectively) to create the parking brake force to restrict or prevent movement of a wheel or vehicle. During release of the parking brake, the clamp force is reduced so that the wheel or vehicle can once again move. One skilled in the art may understand that over time the friction material of the brake pads and brake shoes wear, thus requiring the brake pads and shoes to be moved further towards a braking surface to create sufficient clamp force or parking brake force. Accordingly, to compensate for this additional required movement of not only the brake pads and shoes but also the actuator assemblies, the motor position changes to create the required clamp force. Thus, the LTV 300 continuously updates to compensate for this wear and the corresponding changes in the position of the motor and/or actuator. These updates are accomplished at the force estimation model 306, which is centered at a zero clearance condition when the brake pads or brake shoes begin to engage the rotor or drum, respectively.

The clamp force output 326 from the force estimation model 306 is input into the linearization model 308. The output of the linearization model 308 is an estimate of the motor load torque 328, which linearizes the state estimation model 304 (i.e., estimated motor position, motor velocity, motor current) using feedback linearization. The estimated motor load torque 328 is fed into the state estimation model 304 along with the estimated states 324 (i.e., xhat; estimated motor position, estimated motor velocity; estimated current draw by the motor, or a combination thereof) that is output from the state estimation model 304. By using motor load torque 328 feedback into the estimation model 304, the system is represented in state space representation where the state A matrix as defined in equations 20 and 22 below is a time variant matrix (ie, A(t)). Feedback linearization about the motor operating load 328 provides the correct linear state space formation for estimation of the internal states (xhat) using equations 36 through 39 below.

Figure 3:
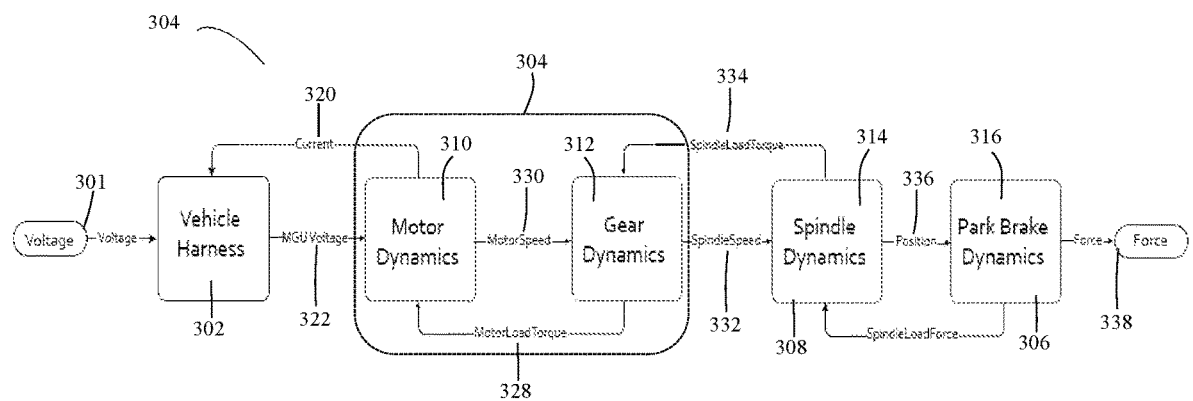
FIG. 3 is a flow diagram of the subcomponents of the state estimation model of the LTV of FIG. 2.

FIG. 3 illustrates the LTV 300 defined by a parametric system model. The parametric system model can be described by a motor dynamics subcomponent 310, an MGU dynamics subcomponent 312, an actuator assembly dynamics subcomponent 314, and a brake caliper dynamics subcomponent 315. One or more models or subcomponents may define the LTV.

During the parking brake apply, or release of the parking brake, as the motor 124 is loaded, the motor 124 draws additional current, which, as was discussed above, is an output measurement 322 from the harness model 302. Motor speed 330 and motor current 320 are estimated as outputs from the motor dynamics model 310. Motor speed 330 and motor current 320 are estimated based on the voltage measurement output 322 and motor load torque 328. The motor speed 330 and correspondingly spindle position 336 are used to determine a motor load torque 328, which is fed back into the motor dynamics model 310 so that the LTV 300 can continuously update the motor position 324. Spindle speed 332 is based on the motor speed 330 and is output from the gear dynamics model 312 and input into the spindle dynamics model 314 to determine a spindle torque 334 based on the load force feedback from the park brake dynamics 316. A position 336 of the spindle is related to the spindle speed 332. The spindle position 336 is output from the spindle dynamics model 314, and input into the park brake dynamics 316. The spindle force 338 is output from the park brake dynamics 338 and also fed back into the spindle dynamics model 314 so that the LTV 300 can continuously update the spindle position 336 to spindle load force 338 as the brake pads or brake shoes wear over time. The spindle load force 338 is related to the clamp force 326 discussed in FIG. 2.

The motor dynamics subcomponent 310 may be modeled using Kirchoff's Voltage Law, Torque balance equations, and/or Ohm's Law. The input voltage 301 to the motor 124 may be derived from an observed electronic control current and voltage using a nominal vehicle harness resistance. The generated motor torque ($K_t i$) and back electromotive force (EMF) voltage may be a function of the measured current 320, motor speed 330, and a motor constant. The motor terminal voltage may be estimated based on the harness resistance and current observation 320 based on Ohm's Law. The motor voltage (U) 322 may be equated as the measured ESC voltage ($V_{esc}$) minus the harness voltage drop ORO as shown in EQ1.

$$U = V_{esc} - iR_r \quad \text{EQ1:}$$

The rate of current change 320 in the parametric system model can be represented as the applied motor voltage (U), minus the back EMF voltage and resistance drop within the circuit, as shown in EQ2, where L represents the circuit inductance, R the circuit resistance, and Kb the motors back EMF constant.

$$\frac{di}{dt} = -\frac{iR}{L} = \frac{K_b \dot\theta}{L} + \frac{1}{L} U \quad \text{EQ2}$$

Within the torque balance equations, the inertia (J) may consist of a motor component in addition to an equivalent reflected inertia from the actuator assembly, including the spindle and the nut. For high reduction systems, as is typical of motor on caliper systems, the equivalent downstream inertia can often be ignored due to equivalent inertia having the relationship of $1/R^2$. Motor acceleration may therefore be a function of the motor torque ($K_t i$), minus the motor load torque ($T_m$) 328 and viscous losses due to internal damping (v), as shown in EQ3.

$$\frac{d\dot\theta}{dt} = -\frac{T_m}{J} - \frac{v\dot\theta}{J} + \frac{K_y i}{J} \quad \text{EQ3}$$

The MGU dynamics subcomponent 312 may be a model of the amplified motor torque ($T_m$) applied to the actuator assembly. The total amplification may be a function of the lumped reduction ratio ($R_t$) and gear efficiency ($\eta_t$). This relationship may be indicated by EQ 4, where spindle torque is represented by $T_s$.

$$T_m(t) = \frac{T_s(t)}{R_s \eta} \quad \text{EQ4}$$

The actuator assembly dynamics subcomponent or spindle dynamics 314 may be a model of the spindle and nut. The parking brake force, F(t), may be related to the spindle torque ($T_s(t)$), based on one or more spindle and nut parameters. The relationship between the parking brake force F(t) and spindle torque ($T_s(t)$) may be dependent on the particular operating mode of the spindle (e.g., whether the spindle is being operating during a parking brake apply or release of the parking brake) and may be represented as a piecewise equation with respect to a motor and/or spindle velocity. Due to the self-locking effect between the spindle and the nut, there is considerable stiction (i.e., friction that prevents the spindle and nut from being set in motion) within the actuator assembly when transitioning from static to dynamic friction. Accordingly, because estimation only is only valid during non-zero motor speed, the actuator assembly stiction can be ignored and the dominant friction during operation can be considered dynamic.

The spindle torque equations for both a parking brake apply and release of the parking brake may be defined by equations EQ5 and EQ6, respectively. The spindle factor equations ($SF_{sa}$, $SF_{sr}$) can be expressed in one or more forms for symmetric and non-symmetric threads. For example, the spindle factors $SF_{sa}$, $SF_{sr}$ can be expressed by EQ7 and EQ8, respectively. The spindle parameters may include one or more parameters, such as spindle friction $\mu$, effective spindle diameter dm, spindle lead l, and spindle flank angle $\alpha$. The bearing parameters may include bearing friction $\mu_{db}$ and effective bearing diameter $d_b$. The spindle and bearing parameters (SF) may be evaluated using adaptive control methods to address degradation of the parking brake system over time. Combining EQ5 and EQ7 and EQ6 and EQ8 yields EQ9 and EQ10, respectively.

$$T_{sa}(t) = SF_{sa}F(t) \qquad \text{EQ5}$$

$$T_{sr}(t) = SF_{sr}F(t) \qquad \text{EQ6}$$

$$SF_{sa} = \frac{d_m}{2}\left[\frac{l + \pi\mu_{ds}d_m\sec\alpha}{\pi d_m - \mu_{sd}l\sec\alpha}\right] + \frac{\mu_{db}d_b}{2} \qquad \text{EQ7}$$

$$SF_{sr} = \frac{d_m}{2}\left[\frac{\pi\mu_{ds}d_m\sec\alpha - l}{\pi d_m + \mu_{sd}l\sec\alpha}\right] + \frac{\mu_{db}d_b}{2} \qquad \text{EQ8}$$

$$T_{sa}(t) = \frac{F(t)d_m}{2}\left[\frac{l + \pi\mu_{ds}d_m\sec\alpha}{\pi d_m - \mu_{sd}l\sec\alpha}\right] + \frac{F(t)\mu_{db}d_b}{2} \qquad \text{EQ9}$$

$$T_{sr}(t) = \frac{F(t)d_m}{2}\left[\frac{\pi\mu_{ds}d_m\sec\alpha - l}{\pi d_m + \mu_{sd}l\sec\alpha}\right] + \frac{F(t)\mu_{db}d_b}{2} \qquad \text{EQ10}$$

The caliper dynamics subcomponent or the park brake dynamics 316 and, correspondingly, the brake piston displacement can be related to the generated parking brake force (F(t)) based on system stiffness characteristics. The system stiffness characteristics can be represented by a suitable regression model, such as a $1^{st}$ order regression model, a $2^{nd}$ order regression, a $3^{rd}$ order, a $4^{th}$ order regression model, etc. For example, the system stiffness can be represented by the characteristic shown in EQ16 and EQ17 for the parking brake apply and release of the parking brake, respectively. In a disc brake system, the parking brake force (F(t)) can be implemented by two regression coefficients C1 & C2. These regression coefficients C1 & C2 can further be refined as a function of both temperature and wear to form a model of piston position to parking brake force (F(t)). The parking brake force (F(t)) can correspondingly be substituted within EQ9 and EQ10 to represent spindle torque ($T_s(t)$) as a function of piston position and spindle factor (SF).

$$F(t) = C1x(t)^2 + C2x(t) \qquad \text{EQ11:}$$

$$T_{sa}(t) = SF_{sa}[C1x(t)^2 + C2x(t)] \qquad \text{EQ12:}$$

$$T_{sr}(t) = SF_{sr}[C1x(t)^2 + C2x(t)] \qquad \text{EQ13:}$$

The caliper dynamics subcomponent or the park brake dynamics 316 can be represented using state space notation. The overall efficiency of the parking brake system can be lumped into a single representation for use in adaptive control. This single representation may consist of one or more parameters, such as motor, MGU, bearing, and spindle efficiency parameters. The lumped spindle factor is described below in EQ14 and EQ15 for the parking brake apply and release of the parking brake, respectively. The motor load torque ($T_m$) 328 representation is described in EQ16 and EQ17 after substituting EQ14 and EQ15 into the motor load torque equation EQ4 and the spindle torque equations EQ9, EQ10, respectively.

$$SF'_{sa} = \frac{SF_{sa}}{R_t\eta} \qquad \text{EQ14}$$

$$SF'_{sr} = \frac{SF_{sr}}{R_t\eta} \qquad \text{EQ15}$$

$$T_{ma}(t) = \frac{T_{sa}(t)}{R_t\eta} = \frac{SF_{sa}[C1x(t)^2 + C2x(t)]}{R_t\eta} = SF'_{sa}F(t) \qquad \text{EQ16}$$

$$T_{mr}(t) = \frac{T_{sr}(t)}{R_t\eta} = \frac{SF_{sr}[C1x(t)^2 + C2x(t)]}{R_t\eta} = SF'_{sr}F(t) \qquad \text{EQ17}$$

The parking brake system can be represented in non-linear formation. The internal chosen states of the system can be motor position ($\theta$), motor velocity ($\dot{\theta}$), and motor current (i). System observations are described by the state output (y), and are given for only motor current (i). This motor current observation (i) is made by the control unit, electronic stability controller, or equivalent vehicle hardware. The LTV 300 may rely on knowledge of the input voltage (U) 301 and motor current (i) 320 observations to correct its state estimations (predictor corrector).

$$\frac{d}{dt}\begin{bmatrix}\theta\\\dot{\theta}\\i\end{bmatrix} = \begin{bmatrix}\dot{\theta}\\-\frac{SF'_{si}F(x)}{J} - \frac{\upsilon\dot{\theta}}{J} + \frac{K_t i}{J}\\-\frac{iR}{L} - \frac{K_b\dot{\theta}}{L}\end{bmatrix} + \begin{bmatrix}0\\0\\\frac{1}{L}\end{bmatrix}U \qquad \text{EQ18}$$

$$y = [0\;0\;1]\begin{bmatrix}\theta\\\dot{\theta}\\i\end{bmatrix} \qquad \text{EQ19}$$

The motor load torque ($T_m$) 328 represented in equations EQ16 and EQ17 can be evaluated as a time varying parameter to linearize the state space representation in EQ18 about the current operating motor load. The linearization may be completed through feedback to the state estimation model 304 in order to update the state estimation model 304 in discrete time. The linearized state space formation is shown in equations EQ20-EQ23. This feedback linearization allows for the use of the linear time variant estimation of motor position ($\theta$), motor velocity ($\dot{\theta}$), and motor current (i). This feedback linearization is represented by Fx(t) in EQ22 below.

$$\dot{x}(t) = A(t)x(t) + Bu(t) \qquad \text{EQ20}$$

$$y(t) = Cx(t) + Du(t) \qquad \text{EQ21}$$

$$\frac{d}{dt}\begin{bmatrix}\theta\\\dot{\theta}\\i\end{bmatrix} = \begin{bmatrix}0 & 1 & 0\\-\frac{SF'_{si}F_x(t)}{J\theta} & -\frac{\upsilon}{J} & \frac{K_t}{J}\\0 & -\frac{K_b}{L} & -\frac{R}{L}\end{bmatrix}\begin{bmatrix}\theta\\\dot{\theta}\\i\end{bmatrix} + \begin{bmatrix}0\\0\\\frac{1}{L}\end{bmatrix}U \qquad \text{EQ22}$$

-continued $$y = [001] \begin{bmatrix} \theta \\ \dot{\theta} \\ i \end{bmatrix} \quad \text{EQ23}$$

Observability (Ob) may refer to a how well the internal states of the system (i.e., motor position (θ), motor velocity ($\dot{\theta}$), and motor current (i)) can be inferred by knowledge of its external outputs. A system may be observable if for any possible sequence of state and control vectors, the current state can be determined in finite time using only the outputs. This quality may be evaluated by checking the rank of the observability matrix of equations EQ34 and EQ35. All of the parameters within the observability matrix of EQ35 may be constant time invariant parameters except for the generated parking brake force ($F_x(t)$). The generated parking brake force ($F_x(t)$) may be a time variant parameter. The generated parking brake force ($F_x(t)$) can take on either a positive, real representation of the parking brake force, or a value of zero. In the case of generation of the parking brake force, the observation matrix may be of full rank, which may correspond to complete observability. Complete observability may mean that all internal system states can be estimated based on the motor current (i) observation.

During a parking brake apply, the parking brake force and position of the motor, actuator assembly, or both may be coupled and provide for a predictor corrector relationship so that the estimates are corrected based on the defined system dynamics.

$$Ob = \begin{bmatrix} C \\ CA \\ CA^2 \\ \vdots \\ CA^{n-1} \end{bmatrix} \quad \text{EQ34}$$

$$Ob = \begin{bmatrix} 0 & 0 & 1 \\ 0 & \frac{-K_b}{L} & \frac{-R}{L} \\ \frac{K_b}{L}\frac{SF'_{si}F_x(t)}{\theta J} & \frac{K_b}{L}\frac{v}{J} + \frac{R}{L}\frac{K_b}{L} & \frac{-K_b}{L}\frac{K_t}{J} + \left(\frac{-R}{L}\right)^2 \end{bmatrix} \quad \text{EQ35}$$

The theoretical representation of the LTV 300 with gain (L) may be provided in equations EQ36 and EQ37 for continuous time and equations EQ38 and EQ39 for discrete time representation. The gain (L) can be chosen using pole placement techniques to meet system response specifications. Because the system dynamics are time variant, in case of pole placement design criteria, the gain parameters within the vector L are chosen based on the current operating state such that L=f(F) or correspondingly L=f($T_m$).

$$\dot{\hat{x}} = A\hat{x} + L[y - C\hat{x}] + Bu \quad \text{EQ36:}$$

$$\hat{y} = C\hat{x} + Du \quad \text{EQ37:}$$

$$\hat{x}(k+1) = A(k)\hat{x}(k) + L[y(k) - \hat{y}(k)] + Bu(k) \quad \text{EQ38:}$$

$$\hat{y}(k) = C\hat{x}(k) + Du(k) \quad \text{EQ39:}$$

Another benefit of the state space methodology may be that the estimated and the measured motor current can be used to adapt internal model based parameters over the life of the actuator assembly. In other words, the spindle factor ($SF_{sa}$, $SF_{sr}$) can be lumped with a thrust bearing and MGU efficiency and adapted based on an error between the estimated and measured motor current. This degradation adaptation can be used to adapt the overall parking brake system efficiency within the LTV 300 to account for degradation of the actuator assembly. This adaptation desirably decreases the overall estimation error and/or reduces control variation of force and position, which thereby allows for decreased system sizing, which may ultimately result in reduced weight and system costs. The degradation adaptation can be achieved using equation EQ40 and weighted with respect to prior adaptations to minimize variations in the spindle factor ($SF_{sa}$, $SF_{sr}$) according to EQ41, where ω is a weight assigned to each adaptation where the sum of the weights is equal to 1.

$$SF_{si}'(k) = SF_{si}'(k-1) + C[i_{clamp}(k-1) - \hat{i}_{clamp}(k-1)] \quad \text{EQ40:}$$

$$\overline{SF_{si}'(k)} = \Sigma_{i=0}^n \omega_i SF_{si}'(k-i) \quad \text{EQ41:}$$

Figure 4:
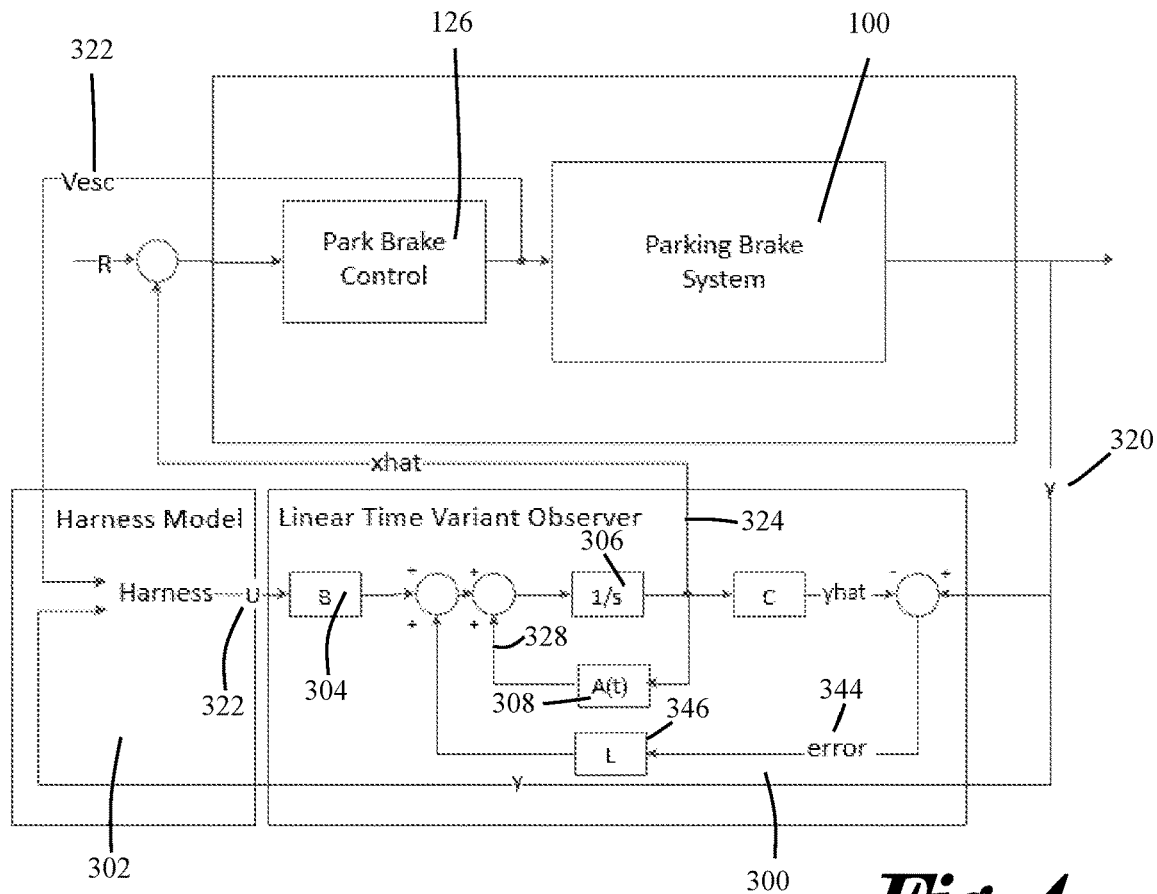
FIG. 4 is a schematic diagram of the LTV monitoring the parking brake system.

FIG. 4 illustrates a schematic diagram of a brake system as described herein. The system includes the brake assembly 100 and actuator assembly 112. It is understood that the harness model subcomponent 302 and the linear time variant observer 300 can be embedded as one or more subcomponents in the control module 126. Motor voltage (U) is measured at 322 and motor current (i) is measured at 320.

As was discussed above regarding FIGS. 2 and 3, motor input voltage (U) 322 is measured at 322, which is supplied to the state estimation model 304 to determine estimates of motor position, motor speed, and motor current 324. The estimated motor position 324 and correspondingly park brake force is supplied to the park brake control module 126. The estimated motor positions 324 (xhat) are linearized at the linearization model matrix 308 using feedback linearization based on motor torque load 328 (see FIG. 3). Estimated current is also compared to the measured current 320 to determine an error at 344 and gain (L) at 346, which is then fed into the force estimation model 306. This feedback into the force estimation model 306 ensures that that the system is updated and corrected based on changes in motor position and clamp force due to wear of the brake pads or brake shoes over time.

As described above, FIGS. 2-4 illustrate a control module 126 that may include a method of estimating the clamp force generated 326, a spindle position 336, a motor position 324, other metrics, or a combination thereof. Such estimation of various parameters may provide the brake system 100 a method of accurately establishing a clamping force on a rotor of a vehicle. It should also be noted that while a brake rotor is described herein, such methodology as discussed may also be applicable to a brake drum assembly as well. That is, clamping force estimation, position estimation, other estimations described herein, or a combination thereof may be utilized on a brake drum assembly.

Figure 5:
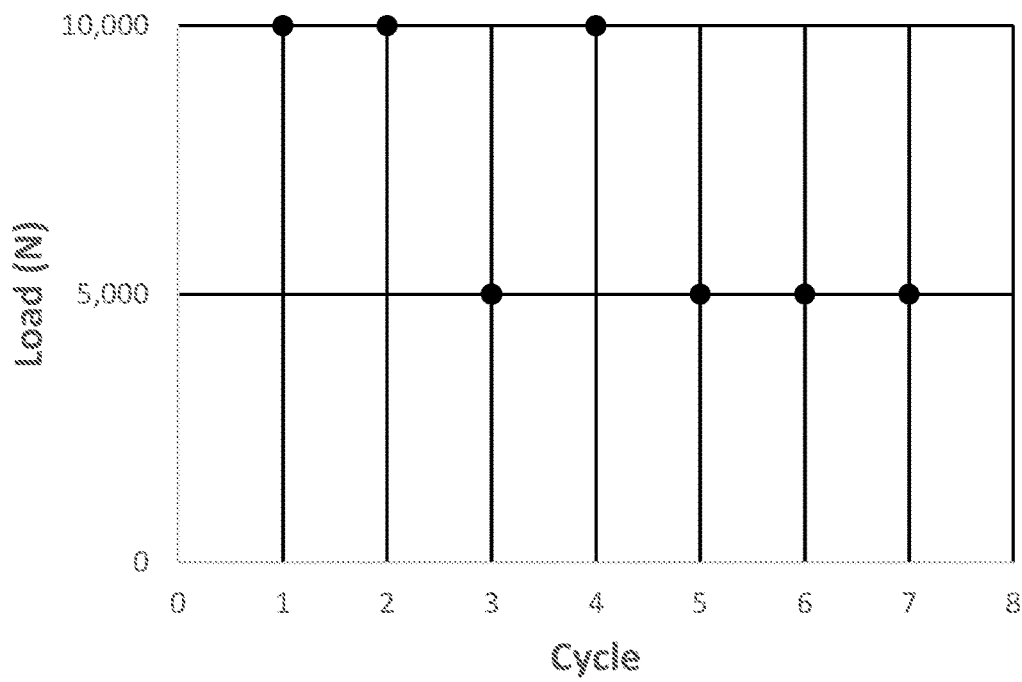
FIG. 5 is a graph illustrating exemplary cumulative damage of a parking brake system.

To further improve the operation of the brake assembly 100 as described, the control module 126 may also monitor cumulative damage of the parking brake system or one or more brake assemblies 100 therein, as shown in FIG. 5. The cumulative damage of the parking brake system may be defined as the ongoing stress on one or more components of the parking brake system over time. Due to the complex and often random variation of loads on the parking brake system, it may be desirable to track a cumulative load on the parking brake system over a number of cycles—that is, in a cumulative manner. In doing so, the control module 126 may track a life cycle of one or more mechanical components within the brake system to determine when the one or more mechanical components may be reaching an end-of-life state, may be showing signs or degradation, or both (i.e., may be reaching a point of failure).

Within the estimation method described in FIGS. 2-4 above, there is a lumped factor SF' which relates the estimated clamp force 326 to the motor load torque 328 within the linearization model 308 (see Equations 5-10 and 14-17 for reference). The lumped factor SF' takes into account a number of parameters dictated by the brake system 100, such as a gear reduction ratio, a gear efficiency, a spindle efficiency, and a bearing efficiency. This lumped factor SF' may then be adapted based on a current estimation error determined by the state estimation model 304 and weighted over a defined number of apply (i.e., clamping) cycles of the brake system 100, as shown in Equations 40 and 41 above.

As the control module 126 utilizes the above factors and calculations to accurately apply a number of clamping force cycles via the brake system 100, the control module 126 may track such cycles and their respective achieved clamping forces (i.e., achieved loads). The tracking of each cycle and its respective load may be stored in memory of the control module 126. A processor within the control module 126 may retrieve such data to determine any existing damage to the brake system.

FIG. 5 illustrates exemplary cycle tracking by the control module 126 as describe above. As shown, each data point may correlate to a specific cycle define as a brake apply or clamping movement of one or more brake assemblies within the brake system 100. Here, a total of 7 separate cycles have been tracked and may be stored within the memory of the control module 126. Each of the 7 cycles may have a respective clamping force (i.e., a load) that was applied by one or more brake assemblies within the brake system to a brake rotor or drum. However, it is also envisioned that each cycle may track any applied load based on the factors determined above. That is, the cycles recorded and/or stored by the control module 126 may be a load applied by the brake system that does not correspond to an actual brake apply sequence. For example, one or more brake assemblies may complete a partial clamping sequence during service that may not qualify as a brake apply sequence, yet the control module 126 may still track the partial clamping sequence to calculate damage to the brake system 100.

As shown in FIG. 5, the cycles may include different load values such as 10,000 N or 5,000 N. The variance in load values may be correlated to varying parking conditions of a vehicle. For example, if a vehicle is parked on an incline or decline, the clamping force may be higher to ensure the vehicle remains stationary. Similarly, if the vehicle is parked on substantially level ground, the clamping force may need not be as high, thus resulting in a much lower load. Therefore, it may be gleaned from the present teachings that the damage monitoring described herein may beneficially account for varying parking conditions of a vehicle. For example, a vehicle consistently parked on an incline or a decline would be tracked with potentially much higher loads on the brake system, thereby warranting repair or replacement after a smaller number of cycles when compared to a vehicle consistently parked on level ground.

After the control module 126 determines the achieved load applied by the brake system or one or more brake assemblies therein during a number of cycles, the processor of the control module 126 may evaluate the stored cycles in the memory to determine a cumulative damage of the brake system. The achieved load and number of cycles may be input into a cumulative damage equation to accurately evaluate such damage of the brake system. One particular equation is Miner's Rule, which may cumulatively track each cycle ($n_i$) against an average number of cycles to failure ($N_i$) at each stress or load level ($S_i$), where (C) is the fraction of life consumed by exposure to the cycles ($n_i$) at the different stress or load levels ($S_i$), as shown in EQ42 below:

$$\sum_{i=1}^{k} \frac{n_i}{N_i} = C \qquad \text{EQ42}$$

For purposes of calculation, failure of the brake system or one or more components therein may occur when C=1. As such, it is envisioned that the control module 126 may utilize Miner's Rule to monitor the fraction of life (C) consumed by the brake system and compare such value to a determined threshold criteria. For example, if failure occurs when C=1, the threshold criteria may be when C reaches a value less than 1 (e.g., 0.9, 0.8, 0.7, 0.6, etc.). As such, the control module 126 may preemptively determine that the brake system is nearing a failure point, thereby allowing a user to service and/or replace the brake system or one or more components therein. It should be noted that the threshold criteria may vary between different brake systems and may be adjusted to a desired sensitivity level based on vehicle guidelines. However, by establishing a threshold prior to failure, the control module 126 may prevent catastrophic failure of the brake system that may cause damage to the vehicle, injury to an occupant, or both.

To accurately determine the fraction of life consumed (C), each load level (e.g., 10,000 N and 5,000 N as shown in FIG. 5) may be evaluated to determine the average number of cycles until failure ($N_i$). As discussed above, these load levels may correspond to a load required for effectively completing a parking brake apply in different parking conditions, such as on an incline or decline versus on level ground. Once the average number of cycles until failure ($N_i$) has been determine for each applicable load level, the control module 126 may cumulatively track each cycle and respective load and store such data in memory. During such tracking, the control module 126 may also evaluate the tracked data via the processor in a continuous manner using Miner's Rule as shown in EQ42. The continuous manner in which the data is evaluated will count and add each load cycle against the average number of cycles until failure ($N_i$) to determine the fraction of life consumed (C). When the fraction of life consumer (C) reaches failure (i.e., C=1) or an established threshold, a signal or warning may be sent to one or more locations. For example, a signal or warning regarding potentially upcoming failure of the brake system may be a warning within the vehicle for an occupant, may be sent to an original equipment manufacturer (OEM) of the vehicle for data analysis, or both. However, it should also be noted that the method of calculating cumulative damage done by the control module 126 may also be stored within the control module and may be free of any warnings or signals sent to outside locations.

Table 1 below illustrates the aforementioned cumulative damage calculation based upon the cycle datapoints of FIG. 6. As shown below, the 10,000 N and 5,000 N load levels may be defined as levels 1 and 2, respectively. For each load level, the hypothetical average number of cycles until failure ($N_1$) and ($N_2$) is 10 and 100, respectively. Thus, the hypothetical average number of cycles until failure may be higher when the load per cycle is decreased, as illustrated in the exemplary table below.

TABLE 1

Cumulative Load for FIG. 5.

| Cycle | No. of Cycles 10,000 N (i = 1) | No. of Cycles 5,000 N (i = 2) | $\sum \frac{n_1}{10}$ | $\sum \frac{n_2}{100}$ | C |
|---|---|---|---|---|---|
| 1 | 1 | 0 | 1/10 | 0/100 | 1/10 |
| 2 | 2 | 0 | 2/10 | 0/100 | 2/10 |
| 3 | 2 | 1 | 2/10 | 1/100 | 21/100 |
| 4 | 3 | 1 | 3/10 | 1/100 | 31/100 |
| 5 | 3 | 2 | 3/10 | 2/100 | 32/100 |
| 6 | 3 | 3 | 3/10 | 3/100 | 33/100 |
| 7 | 3 | 4 | 3/10 | 4/100 | 34/100 |

As shown, the number of cycles for both load levels 1 and 2 are cumulatively tracked and summed to determine a fraction of life consumed by the brake system over the 7 total cycles. As the number of cycles and respective applied loads increases, the brake system nears a point of failure (i.e., C=1). Such failure may occur by one or more mechanical components within the brake system failure, such as the motor 124, the spindle 118, the actuator assembly 112, the nut 120, another component, or a combination thereof.

It is also envisioned that the simplified Miner's Rule calculation completed above may be modified to account for even further variables during brake system operation. For example, while Miner's Rule may account for each level of stress or achieved load due to different categorized load levels (e.g., 10,000 N and 5,000 N), a conventional application of Miner's Rule may fail to account for additional factors impact the damage level of the brake system. As a result, one or more additional parameters may be included in the cumulative damage calculation by the control module 126 as a weighted value to more accurately reflect wear on the brake system. Some parameters may include a temperature (e.g., external temperature, temperature of the brake system, or both), voltage levels within the system, brake pad 104, 106 wear, or a combination thereof.

For example, if a vehicle is at times being operated at a significantly heightened or lower temperature, a significantly heightened or lowered voltage, or both, it may be found that the brake system incurs increased damage when compared to nominal or ambient operating conditions. Thus, each parking brake apply cycle completed at the heightened or lower temperatures, heightened or lower voltage, or both, may be weighted by a defined value, thereby more accurately reflecting the actual damage incurred by the brake system while determining the cumulative damage. Similarly, during increased brake wear of the brake pads 104, 106, the spindle 118 may be at decreased engagement, thereby leading to increased damage or wear on the brake system. Thus, a similar weighting or scaling may be completed by factoring in a defined value for those cycles when determining the cumulative damage of the brake system using Miner's Rule.

Like how scaling or weighting may be utilized within the cumulative damage calculation, updating the parameters within the linearization model 308 or any other model may also help more accurately predict the accumulated damage of the brake system. As the linearization model 308 within the method of estimation described above (see FIGS. 2-4) relates the estimated clamp force 326 to the estimated motor load torque 328 based on a dynamic (e.g., continuous) model, the accuracy of the cumulative damage calculation may be improved by utilizing updated values for the estimated clamp force 326 and the estimated motor load torque 328 within the dynamic model. Thus, the cumulative damage may be calculated based upon the most recent and accurate load (i.e., clamp force) parameters. Utilizing updated parameters within the accumulated damage calculations and/or based upon the accumulated damage calculations may provide for increased and/or more accurate estimation when the brake system is in a degraded condition as the brake system approached end of life (C).

While Miner's Rule has been described herein as the method of determining cumulative damage of the brake system, it is envisioned that any cumulative damage theories may be implemented. Some additional cumulative damage theories include Valluri's theory, Grover's theory, the Corten-Dolan theory, the Freudenthal-Heller theory, Shanley's theory, the 2-x method, or a combination thereof. As such, it may be gleaned form the present teachings that the cumulative damage calculation of the control module 126 described herein may be adapted based on a given brake system to most accurately calculate the cumulative damage of the brake system.

Similarly, while the parameters and method of operation of the brake system described herein utilizes position and clamping force estimations, actual recorded or calculated values may also be utilized. One or more positions of the brake system or one or more brake assemblies therein may be accurately calculated—not estimated—and may thus be utilized in the cumulative damage estimation. As such, it is envisioned that while the above cumulative damage methodology is discussed with respect to electric parking brake, other brake systems may also utilize the cumulative damage calculations described above.

For example, an electromechanical brake (EMB) system, such as a service brake system, may implement a similar cumulative damage calculation within its control module. One distinguishing factor may be that the EMB system includes one or more position sensors, one or more load sensors, or both, contrary to the above-described electric parking brake system being free of any position or load sensors. As a result, the EMB system may accurately measure with the one or more load sensors an actual clamp load for one or more service brake assemblies within the EMB system. As a result, the control module within the EMB system may then advantageously calculate cumulative damage based on actual clamp load measurements. That is, the control module within the EMB system may determine the cumulative damage of the EMB system similar to an EPB system, except actual load measurement via the one or more load sensors may be input into the calculations as opposed to estimated values. Similarly, the one or more position sensors may also provide actual position measurements for input into the cumulative damage calculations, thereby potentially providing a more accurate determination of each cycle of service brake apply. As such, it may be gleaned from the present teachings the cumulative damage method described herein is not intended to be limited to any specific brake system configuration. Instead, the cumulative damage method may beneficially be adapted to accurately measure cumulative damage in a number of different brake systems.

The explanations and illustrations presented herein are intended to acquaint others skilled in the art with the invention, its principles, and its practical application. The above description is intended to be illustrative and not restrictive. Those skilled in the art may adapt and apply the invention in its numerous forms, as may be best suited to the requirements of a particular use.

Accordingly, the specific embodiments of the present invention as set forth are not intended as being exhaustive or limiting of the teachings. The scope of the teachings should, therefore, be determined not with reference to this description, but should instead be determined with reference to the appended claims, along with the full scope of equivalents to which such claims are entitled. The omission in the following claims of any aspect of subject matter that is disclosed herein is not a disclaimer of such subject matter, nor should it be regarded that the inventors did not consider such subject matter to be part of the disclosed inventive subject matter.

Plural elements or steps can be provided by a single integrated element or step. Alternatively, a single element or step might be divided into separate plural elements or steps.

The disclosure of "a" or "one" to describe an element or step is not intended to foreclose additional elements or steps.

While the terms first, second, third, etc., may be used herein to describe various elements, components, regions, layers and/or sections, these elements, components, regions, layers and/or sections should not be limited by these terms. These terms may be used to distinguish one element, component, region, layer or section from another region, layer, or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The disclosures of all articles and references, including patent applications and publications, are incorporated by reference in their entireties for all purposes. Other combinations are also possible as will be gleaned from the following claims, which are also hereby incorporated by reference into this written description.

Unless otherwise stated, a teaching with the term "about" or "approximately" in combination with a numerical amount encompasses a teaching of the recited amount, as well as approximations of that recited amount. By way of example, a teaching of "about 100" encompasses a teaching of within a range of 100+/−15.

ELEMENT LIST

100 Brake Assembly
102 Brake Caliper
104 Inner Brake Pad
106 Outer Brake Pad
108 Brake Piston
110 Parking Brake System
112 Actuator Assembly
114 Friction Material
116 Pressure Plate
118 Spindle
120 Nut
122 Motor Gear Unit (MGU)
124 Motor
126 Control Module
128 Piston Pocket
300 Linear Time Variant (LTV)
301 Input Voltage
302 Harness Model
303 Input Current
304 State Estimation Model
306 Force Estimation Model
308 Linearization Model
310 Motor Dynamics
312 Motor Gear Unit (MGU) Dynamics
314 Actuator Assembly Dynamics
315 Brake Caliper Dynamics
320 Motor Current
322 Motor Voltage
324 Estimated Motor Position
326 Estimated Clamp Force
328 Estimated Motor Load Torque
330 Motor Speed
332 Spindle Speed
334 Spindle Torque
336 Spindle Position
338 Spindle Load Force
344 Error
346 Gain

What is claimed is:

1. A method of determining cumulative damage of an electric park brake system or an electromechanical brake system, the method comprising:
   (a) estimating or measuring one or more brake forces based upon one or more parameters;
   (b) determining a cycle for each of the one or more brake forces and associating each of the one or more brake forces with the cycle; and
   (c) determining the cumulative damage of the electric park brake system or the electromechanical brake system based upon the cycle and the associated brake force; and
   wherein a signal or warning is transmitted when the cumulative damage exceeds a threshold value.

2. The method of claim 1, wherein step (a) is completed by estimating a rotational angle of a motor of the electric park brake system or the electromechanical brake system based upon the one or more parameters to estimate the one or more brake forces.

3. The method of claim 2, wherein the one or more parameters are a measured voltage and a measured current of the motor.

4. The method of claim 3, including, prior to step (c), storing each of the cycles and the associated brake forces, wherein the cycles are grouped together by brake force.

5. The method of claim 4, wherein determining the cumulative damage in step (c) is completed by determining a fraction of life consumed by the electric park brake system or the electromechanical brake system, and the fraction of life consumed by the electric park brake system or the electromechanical brake system is determined by comparing a total number of the cycles in a group to an average number of cycles until failure of the electric park brake system or the electromechanical brake system at the brake force associated with the group.

6. The method of claim 5, wherein the comparing is completed for a plurality of groups, each of the plurality of groups designated by the brake force.

7. The method of claim 1, wherein the cumulative damage in step (c) is determined using Miner's Rule.

8. The method of claim 1, wherein the associated brake force for each cycle is constant or varies, and the associated brake force is based upon parking conditions.

9. The method of claim 1, wherein the cycles and their associated brake forces are each weighted based upon one or more factors.

10. The method of claim 9, wherein the one or more factors include an external temperature during operation of the electric park brake system or the electromechanical brake system, an internal temperature during operation of the electric park brake system or the electromechanical brake system, a voltage within the electric park brake system or the electromechanical brake system, a pad wear condition of one or more brake pads in the electric park brake system or the electromechanical brake system, or a combination thereof.

11. The method of claim 1, wherein the electric park brake system or the electromechanical brake system is free of a pressure sensor, a force sensor, a position sensor, or a combination thereof.

12. The method of claim 1, wherein the cumulative damage of the electric park brake system or the electromechanical brake system determines a point of degradation or failure of the electric park brake system or the electromechanical brake system or one or more components of the electric park brake system or the electromechanical brake system.

13. The method of claim 12, wherein the one or more components are a motor, a spindle, an actuator assembly, a nut, or a combination thereof.

14. The method of claim 1, wherein the method is completed within a control module of the electric park brake system or the electromechanical brake system.

15. The method of claim 14, wherein storage of the cycles is completed by a memory unit of the control module and step (c) is completed by one or more processors of the control module.

16. The method of claim 1, wherein the cumulative damage of step (c) is compared to the threshold value.

17. The method of claim 16, wherein the threshold value is less than a value when failure of the electric park brake system or the electromechanical brake system occurs.

* * * * *